(12) United States Patent
Sehra et al.

(10) Patent No.: US 10,311,723 B2
(45) Date of Patent: Jun. 4, 2019

(54) PARKING MANAGEMENT SYSTEM AND METHOD

(71) Applicant: Intel Corporation, Santa Clara, CA (US)

(72) Inventors: Suman A. Sehra, Folsom, CA (US); Sameer Sharma, Santa Clara, CA (US); Purushottam Kumar, Chandler, AZ (US); Karthik Vasan, Chandler, AZ (US); Sergio Piedrahita, Santa Clara, CA (US); Robin Mcgechie, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/645,113

(22) Filed: Jul. 10, 2017

(65) Prior Publication Data

US 2018/0018870 A1 Jan. 18, 2018

Related U.S. Application Data

(60) Provisional application No. 62/363,057, filed on Jul. 15, 2016.

(51) Int. Cl.
G08G 1/017 (2006.01)
G08G 1/04 (2006.01)
(Continued)

(52) U.S. Cl.
CPC ........... *G08G 1/04* (2013.01); *G06K 9/00771* (2013.01); *G06T 5/002* (2013.01); *G06T 7/11* (2017.01); *G06T 7/194* (2017.01); *G08G 1/015* (2013.01); *G08G 1/0175* (2013.01); *G08G 1/142* (2013.01); *G08G 1/143* (2013.01); *G08G 1/144* (2013.01);
(Continued)

(58) Field of Classification Search
CPC .......... G08G 1/14; G08G 1/141; G08G 1/143; G08G 1/144; G08G 1/145; G08G 1/147; G08G 1/148; G08G 1/04; G08G 1/146; G08G 1/015; G08G 1/0175; G08G 1/142; H04N 7/181; G06K 9/00771; G06T 7/194;
(Continued)

(56) References Cited

U.S. PATENT DOCUMENTS

| 8,682,036 B2 * | 3/2014 | Wang | G06K 9/3258 340/937 |
| 2005/0083212 A1 * | 4/2005 | Chew | G08G 1/14 340/932.2 |

(Continued)

*Primary Examiner* — Anh V La
(74) *Attorney, Agent, or Firm* — Schwabe, Williamson & Wyatt, P.C.

(57) ABSTRACT

Apparatuses, methods and storage media associated with parking management are disclosed herein. In embodiments, a system may include a plurality of sensors disposed around an expanse of space to collect occupancy data of the expanse of space; and a parking management unit disposed in or adjourning the expanse of space to manage parking of vehicles in the expanse of space, based at least in part on the occupancy data collected by the plurality of sensors. The expanse of space may be a linear expanse of roadway space adjacent to a sidewalk, or an aerial expanse of surface space of a parking lot or a floor of a parking structure. Parking spaces within the expanse of space may be fixed or variably sized/typed. Other embodiments may be disclosed or claimed.

23 Claims, 7 Drawing Sheets

(51) Int. Cl.
| | |
|---|---|
| *H04N 7/18* | (2006.01) |
| *G06K 9/00* | (2006.01) |
| *G06T 7/194* | (2017.01) |
| *G06T 5/00* | (2006.01) |
| *G06T 7/11* | (2017.01) |
| *G08G 1/015* | (2006.01) |
| *G08G 1/14* | (2006.01) |
| *G06Q 10/02* | (2012.01) |
| *B60W 30/06* | (2006.01) |

(52) U.S. Cl.
CPC .............. *G08G 1/146* (2013.01); *G08G 1/147* (2013.01); *H04N 7/181* (2013.01); *B60W 30/06* (2013.01); *G06Q 10/02* (2013.01)

(58) Field of Classification Search
CPC .......... G06T 5/002; G06T 7/11; B60W 30/06; G06Q 10/02
USPC .......... 340/937, 932.2, 905, 995.1, 928, 933
See application file for complete search history.

(56) References Cited

U.S. PATENT DOCUMENTS

| | | | | |
|---|---|---|---|---|
| 2014/0036076 A1* | 2/2014 | Nerayoff | ................ | H04N 7/181 348/148 |
| 2014/0335897 A1* | 11/2014 | Clem | ................... | G08G 1/0112 455/456.3 |
| 2014/0343891 A1* | 11/2014 | Becker | ................. | G07F 17/246 702/150 |
| 2016/0098929 A1* | 4/2016 | Nakhjavani | ............ | G08G 1/144 340/932.2 |

\* cited by examiner

PARKING MANAGEMENT SYSTEM AND METHOD

RELATED APPLICATION

This is a non-provisional application of U.S. Provisional Application 62/363,057, entitled "Smart Parking System," filed on Jul. 15, 2016, and claims priority to said provisional application. The Specification of 62/363,057 is hereby fully incorporated by reference.

TECHNICAL FIELD

The present disclosure relates to the fields of computer vision, artificial intelligence, Internet-of-Things, and computer-assisted or autonomous driving, in particular, to apparatuses, methods and storage media associated with smart parking management.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Cities are increasingly becoming 'online', but smart city technologies are typically deployed ad hoc and must support the multiple generations of technology used by the populace. Sensors, and compute that enable a smart city are not easily integrated into the existing ICT (information and communication technology) infrastructure of a city or municipality without extensive and expensive retrofitting.

Today's parking systems that have been retrofitted to be smart, offer limited intelligence to identify if there are available parking spaces and may automate the payment process over wireless. The parking spaces on the street or parking structures still remain fixed size which results in an inefficient use of 'limited' parking space available in big cities since automobiles come in variety of sizes. Parallel parking spaces are typically pre-fixed at ~2.76 meters (9.1 ft) wide by ~6.1 meters (20 ft) long. Further, parking spaces are often fix typed for handicapped, car pool, passenger loading/unloading, truck zone, or general use.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage media associated with smart parking management are disclosed herein. In embodiments, a smart parking management system may include a plurality of sensors disposed around an expanse of space to collect occupancy data of the expanse of space; and a parking management unit disposed in or adjourning the expanse of space, and communicatively coupled with the plurality of sensors, to manage parking of vehicles in the expanse of space, based at least in part on the occupancy data collected by the plurality of sensors. In embodiments, the expanse of space may be a linear expanse of roadway space adjacent to a sidewalk, an aerial space of a parking lot or a floor of a parking structure. Parking spaces within the expanse of space may be fixed or variably sized/typed.

In embodiments, the smart parking management system may comprise a plurality of depth perception cameras and/or embedded sensors, a pre-processor, a detection/identification engine, a scene segmentation engine, a parking spatial determination engine, and a parking space allocation engine. In embodiments, selected ones of the pre-processor, the detection/identification engine, the scene segmentation engine, and/or the parking spatial determination engine may be implemented at the parking management unit disposed in or adjourning the expanse of space being managed, or on one or more remote cloud servers. In embodiments, each parking management unit may be dedicated to the management of one expanse of space, or manage parking for a plurality of adjourning expanses of space. In embodiments, the one or more remote cloud servers may support a plurality of the parking management units disposed in or adjourning the expanses of space being managed.

These and other aspects will be further described below. In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "engine" may refer to, be part of, or include an Application Specific Integrated Circuit (ASIC), an electronic circuit, a programmable combinatorial logic circuit, such as field programmable gate array (FPGA), a computer processor (shared, dedicated, or group) and/or memory (shared, dedicated, or group) that execute one or more software or firmware programs generated from a plurality of programming instructions, and/or other suitable components that provide the described functionality.

Figure 1:
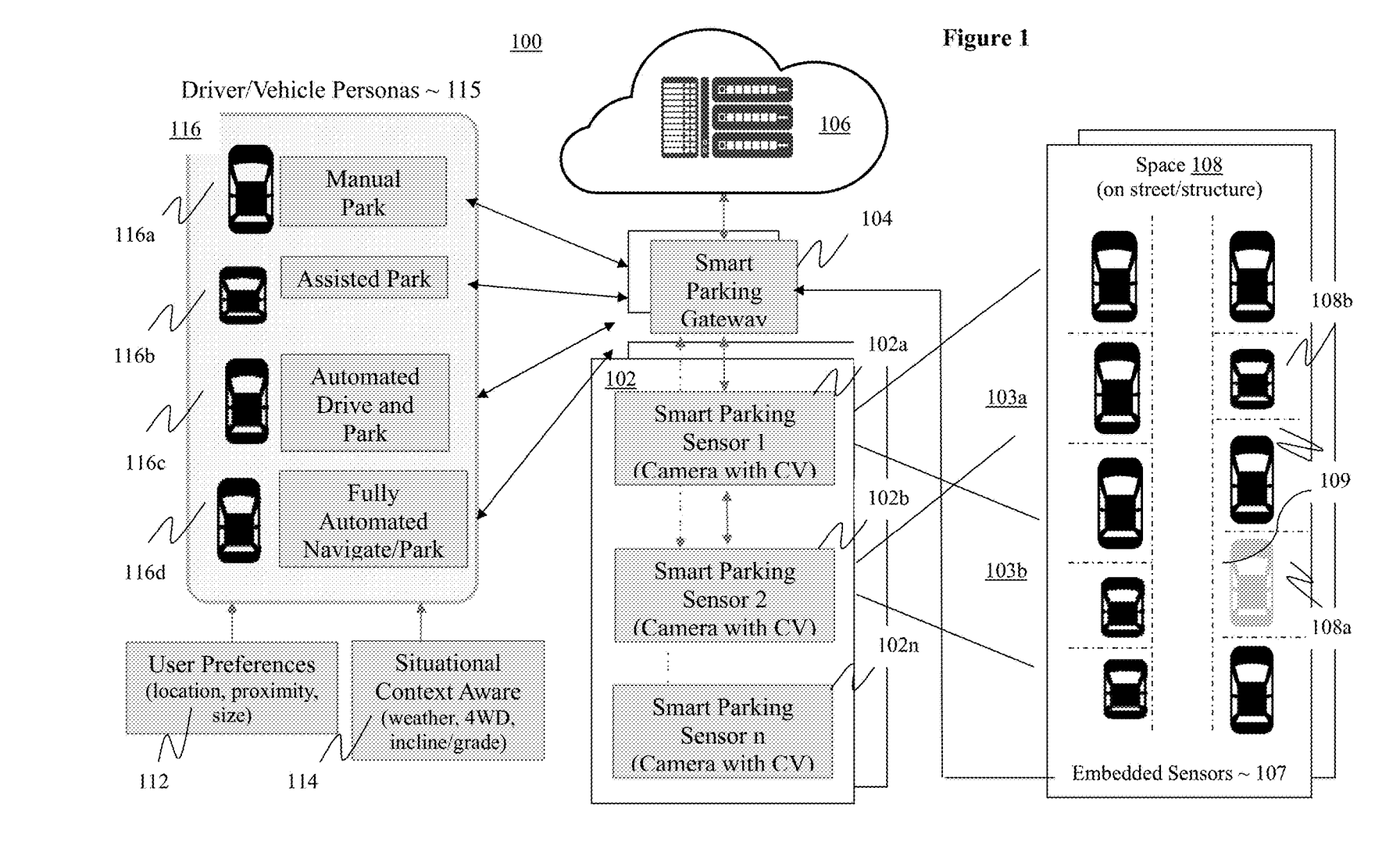
FIG. 1 is an overview of a smart parking management system of the present disclosure, in accordance with various embodiments.

Referring now to FIG. 1, wherein an overview of a smart parking management system of the present disclosure, in accordance with various embodiments, is shown. As illustrated, smart parking management system 100 of the present disclosure for managing parking of vehicles in a number of expanses of space 108 may comprise a number of sets 102 of smart parking sensors, and a number of smart parking management units 104 (also referred to as smart parking gateways). In embodiments, each expanse of space 108 being managed may have a set 102 of smart parking sensors having a number of sensors 102a-102n locally disposed around the expanse of space 108 to sense and collect occupancy data associated with the expanse of space 108. Further, a smart parking management unit/gateway 104 may be locally disposed in or adjoining the expanse space 108, communicatively coupled to the local set 102 of smart parking sensors 102a-102n, to manage parking vehicles within the local expanse of space 108 based at least in part on the occupancy data collected by the local set 102 of smart parking sensors 102a-102n.

Figure 2A:
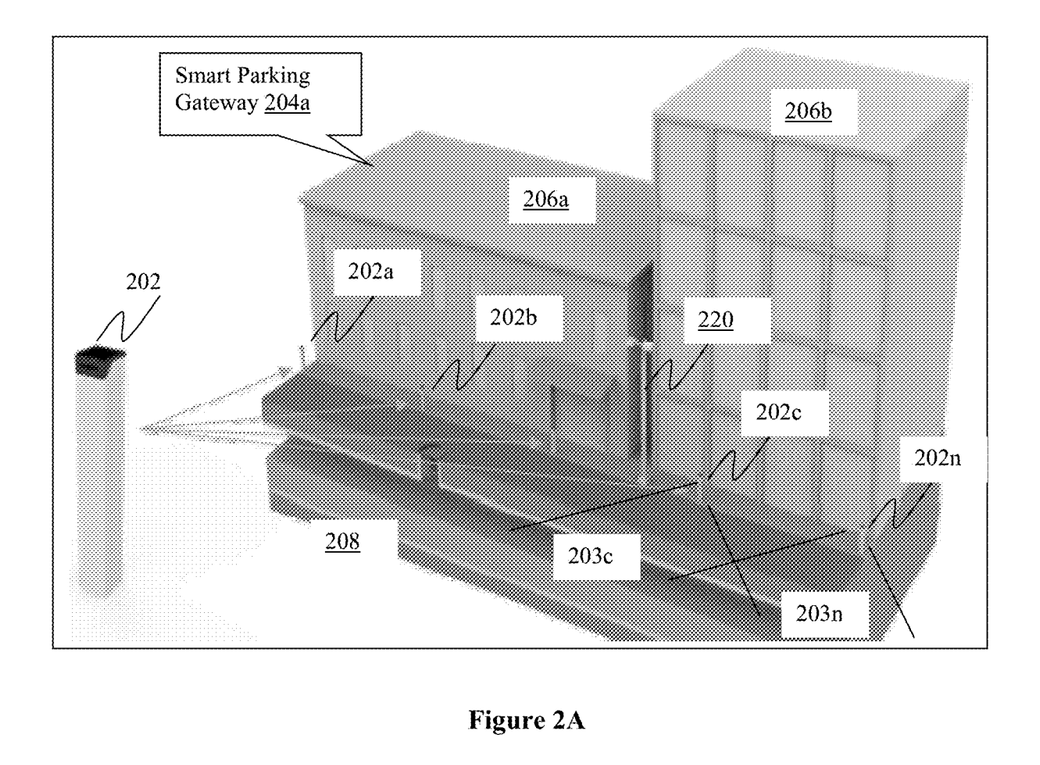
FIG. 2A is a perspective view of some aspects of a smart parking management system for managing a linear expanse of roadway space adjacent to a sidewalk, in accordance with various embodiments.
Figure 2B:
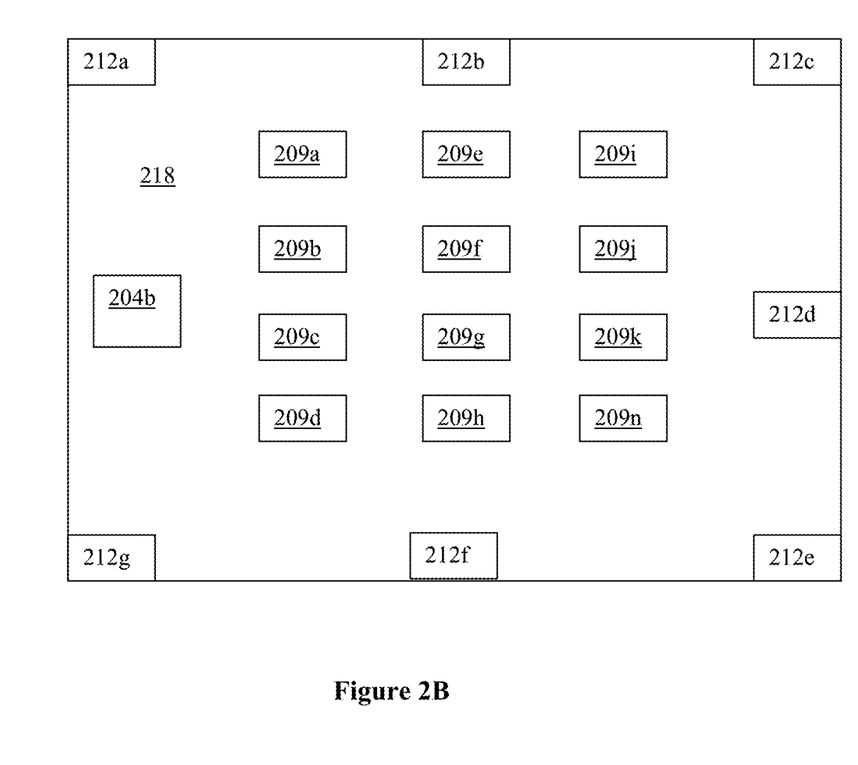
FIG. 2B is a schematic view of some aspects of a smart parking management system for managing an aerial expanse of surface space of a parking lot or a floor of a parking structure, in accordance with various embodiments.
Figure 3:
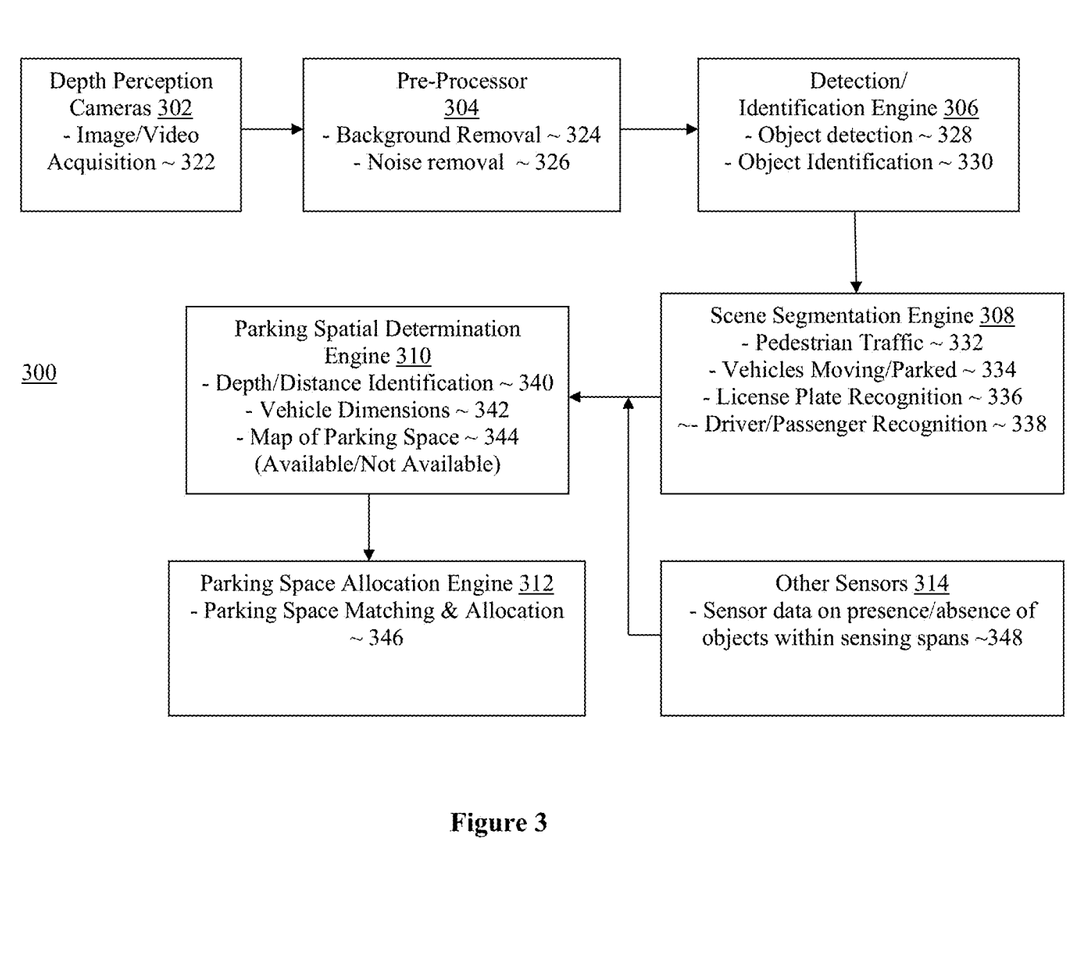
FIG. 3 is a functional view of a smart parking management system, in accordance with various embodiments.

In embodiments, an expanse of space 108 may be a linear expanse of roadway space adjacent to sideway (FIG. 2), an aerial expanse of surface space of a parking lot or a floor of a parking structure (FIG. 3). In embodiments, the sizes of the parking spaces 108a, 108b . . . within an expanse of space 108 may be fixed/uniform, or variable (dynamically determined by smart parking management unit/gateway 104). Similarly, the usage types of the parking spaces 108a, 108b . . . within an expanse of space 108 may be fixed/uniform, such as handicapped, car pool, passenger loading/unloading, truck zone, general use, and so forth, or variable (dynamically determined by smart parking management unit/gateway 104).

In some embodiments where the sizes of the parking spaces 108a, 108b . . . are variable (dynamically determined by smart parking management unit/gateway 104), visual indicators 109 may be provided to delineate the variable sized parking spaces 108a, 108b optionally, including their usage types. Examples of visual indicators 109 may include but are not limited to light emitting diodes (LED) that may be turned on/off, or demarcations projected by projectors (not shown), under the control of the local smart parking management unit/gateway 104.

In embodiments, smart parking sensors 102 may be cameras, e.g., depth cameras, to capture images, e.g., depth images, of the corresponding expanses of spaces 108, and provide the captured images to the corresponding smart parking management units/gateways 104, thereby allowing the corresponding smart parking management units/gateways 104 to be able to have computer vision (CV) 103a, 103b . . . , to see/determine the occupancy situation of the corresponding expanses of spaces 108 (through analysis of the captured images). In embodiments, additional sensors 107 configured to sense presence or absence of objects within respective sensitive spans may be provided and embedded at various locations with the respective expanses of space 108, to provide additional sensing data of presence or absence of objects to smart parking management units/gateways 104, to assist smart parking management units/gateways 104 in determining occupancy status/availability of parking spaces 108a, 108b . . . , within the expanses of space 108.

In embodiments, each smart parking management units/gateways 104 may manage an adjoining expanse of space 108. In some embodiments, each smart parking management units/gateways 104 may manage multiple nearby expanses of space 108. In embodiments, smart parking management units/gateways 104 may be supported by one or more cloud servers 106. That is, some aspects of the processing/computation associated with management parking, e.g., determination of occupancy status/availability of parking spaces 108a, 108b . . . within respective expanses of space 108, dynamically typing and/or sizing of parking spaces 108a, 108b . . . , and/or allocation/assignment of available parking spaces 108a, 108b . . . to vehicles 116, may be performed by one or more cloud servers 106.

In embodiments, the vehicles 116 may be vehicles of a number of sizes, including, but are not limited to compact vehicles, standard size vehicles, full size vehicles, sport utility vehicles (SUV), station wagons, vans, pickups, trucks of various lengths, and so forth. Vehicles 116 may have trailers, boats, storage, and/or other equipment in tow. Vehicles 116 may also be of any types, including but are not limited to manual park vehicles 116a, assisted park vehicles 116b, automated drive and park vehicles 116c or fully automated navigate/park vehicles 116d. Manual park vehicles 116a may be vehicles of prior or current generation with no advance driver assistance system (ADAS). For manual park vehicles 116a, their drivers may interact with a smart parking management unit/gateway 104 (e.g., request and receive assignment of available parking spaces 108a, 108b . . . ), via mobile communication devices (not shown), e.g., smartphones, computer tablets or laptops. Assisted park vehicles 116b may be vehicles of current generation with ADAS having driver assistance functions. Automated drive and park vehicles 116c may be vehicles of current or future generation with ADAS having self-driving or auto-pilot capabilities, and fully automated navigate/park vehicles 116d may be vehicles of a future generation with ADAS having autonomous driving capabilities where the passenger can be dropped off at a destination, and the vehicle can go park itself. For assisted park vehicles 116b, automated drive and park vehicles 116c, and fully automated navigate/park vehicles 116d, the corresponding ADAS may interact with the respective smart parking management units/gateways 104 (e.g., request and receive assignment of available parking spaces 108a, 108b . . . ) directly.

In embodiments, each driver or an ADAS of a vehicle may request and accept assignment of an available parking space, in accordance with the driver or the vehicle's persona 115. In embodiments, the driver or the vehicle's persona 115 may be based on the driver/owner's preferences 112, and/or situational context aware factors 114. In embodiments, a driver or a vehicle's preference 112 may include, but are not limited to, location, proximity or parking space size preferences. In embodiments, situational context aware factors 114 may include, but are not limited to, weather conditions, whether the expanse of space 108 is inclined/grade, whether the vehicle is a 4-wheel drive (WD), and so forth.

Referring now to FIG. 2A, wherein a perspective view of some aspects of a smart parking management system for managing a linear expanse of roadway space adjacent to a sidewalk, in accordance with various embodiments, is shown. As illustrated, a smart parking management unit/gateway 204a, which may be one of the earlier described smart parking management units/gateways 104 of FIG. 1, may be provisioned in a building 206a adjourning a linear expanse of roadway space 208 adjacent to a sidewalk in front of buildings 206a and 206b, to manage parking of vehicles in linear expanse of space 208. As described earlier, the parking spaces of roadway space 208 may be fixed sized or variably sized, fixed typed or variably typed.

A set 202 of sensors 202a-202n, which may be sensors 102 of FIG. 1, may be provided along the linear expanse of roadway space 208 adjacent to the sidewalk to sense and collect occupancy data about the linear expanse of roadway space 208 (in the respective vision spans 203c . . . 203 n) for smart parking management unit/gateway 204a. For the example embodiments, sensors 202a-202n may be respectively disposed on a corresponding number of parking meter like structures. In embodiments, one or more of the parking meter like structures may include parking meters to collect parking fees for usage of the assigned parking spaces within linear expanse 208. In other embodiments, some of sensors 202a-202n may be disposed at windows or exterior walls of buildings 206a and 206b, or utility poles 220, such as light poles, electricity poles or communication poles.

As described earlier, a number of sensors (not shown) may also be embedded on or near the roadway or sidewalk space to sense and collect sensor data on presence or absence of objects within predetermined sensing spans of the sensors, at various locations of the roadway space, for smart parking management unit/gateway 204a. Further, smart parking management unit/gateway 204a may be assisted by one or more cloud servers (such as cloud servers 106, not shown in FIG. 2).

As described earlier, various visual indicators, under the control of smart parking management unit/gateway 204a, may be provided to assist in demarking the variably sized, dynamically determined and/or typed parking spaces within roadway space 208.

As described earlier, the vehicles suitable for using parking spaces within roadway space 208 may be any one of a number of vehicles types, with any one of a number of driver or vehicle personas, as earlier described.

Referring now to FIG. 2B, wherein a schematic view of some aspects of a smart parking management system for managing an aerial expanse of surface space of a parking lot or a floor of a parking structure, in accordance with various embodiments, is shown. As illustrated, a smart parking management unit/gateway 204b, which may be one of the earlier described smart parking management units/gateways 104 of FIG. 1, may be provisioned in a an aerial expanse of surface space 218 of a parking lot or a floor of a parking structure, to manage parking of vehicles in the aerial expanse of surface space 218. As described earlier, the parking spaces of surface space 218 may be fixed sized or variably sized, fixed typed or variably typed.

A set 212 of sensors 212a-212g, which may be sensors 102 of FIG. 1, may be provided around the aerial expanse of surface space 218 to sense and collect occupancy data about the aerial expanse of surface space 218 for smart parking management unit/gateway 204b. For the example embodiments, sensors 212a-212g may be respectively disposed on a corresponding number of locations at the perimeters of surface space 218.

As described earlier, a number of sensors (209a-209n) may also be embedded at various locations within aerial space 218 to sense and collect sensor data on presence or absence of objects within predetermined sensing spans of the sensors, at the various locations, for smart parking management unit/gateway 204ab. Further, smart parking management unit/gateway 204b may be assisted by one or more cloud servers (such as cloud servers 106, not shown in FIG. 2B).

As described earlier, various visual indicators, under the control of smart parking management unit/gateway 204b, may be provided to assist in demarking the variably sized, dynamically determined and/or typed parking spaces within roadway space 218.

As described earlier, the vehicles suitable for using parking spaces within roadway space 218 may be any one of a number of vehicles types, with any one of a number of driver or vehicle personas.

Referring now to FIG. 3, wherein a functional view of a smart parking management system, in accordance with various embodiments, is shown. As illustrated, smart parking management system 300, which may be smart parking management system 100 of FIG. 1, may include depth perception cameras 302, pre-processor 304, detection/identification engine 306, scene segmentation engine 308, parking spatial determination engine 310, parking space allocation engine 310, and other sensors 314, operatively coupled with each other.

In embodiments, depth perception cameras 302 may be configured to acquire images or videos 322 of an expanse of space, which parking of vehicles is being managed by smart parking management system 300. In embodiments, pre-processor 304 may be configured to receive and process the captured images to remove background and/or noises 324 and 326 within the captured images/videos 322. Any one of a number of image processing techniques may be employed to process the captured images/videos to remove the background and/or noise from the captured images/videos.

In embodiments, detection/identification engine 306 may be configured to receive and process the background/noise removed images/videos to detect and identify objects 328 and 330 within the background/noise removed images/videos. Any one of a number of object detection/identification techniques may be employed to process the background/noise removed images/videos to detect/identify objects within the background/noise removed images/videos.

In embodiments, scene segmentation engine 308 may be configured to receive and process information/data about the identified objects to recognize pedestrian traffic 332, vehicles moving/parked 334, license plates 336 of vehicles, and/or drivers/passengers of vehicles 338 within the expanse of space being managed. Any one of a number of recognition techniques may be employed to process the information/data about the identified objects to recognize pedestrian traffic 332, vehicles moving/parked 334, license plates 336 of vehicles, and/or drivers/passengers of vehicles 338 within the expanse of space being managed.

In embodiments, parking spatial determination engine 310 may be configured to receive and process information/data about the recognized pedestrian traffic 332, vehicles moving/parked 334, license plates 336 of vehicles, and/or drivers/passengers of vehicles 338, to generate a map of parking spaces 344 for the expanse of space being managed, including available of the parking spaces. In embodiments, as part of the generation of map 344, parking spatial determination engine 310 may determine depth/distance 340 of the expanse of space being managed, including depth/distance 340 of the occupied or unoccupied portions of the expanse of space being managed, as well as dimensions 342 of moving/parked vehicles. From the determined depth/distance 340 of the expanse of space being managed, including depth/distance 340 of the occupied or unoccupied portions of the expanse of space being managed, as well as dimensions 342 of moving/parked vehicles, parking spatial determination engine 310 may determine the parking spaces of the expanse of space being managed, including their sizes, types and/or availability.

The determination of size and type may be based on historical data and/or policies. For example, parking spatial determination engine 310 may always ensure there are n1 spaces for handicapped parking, and n2 spaces for car pool parking by policy. As another example, parking spatial determination engine 310 may always ensure there are p1% of spaces for compact vehicles, p2% of spaces for standard size vehicles, and p3% of spaces for full size vehicles. As still another example, parking spatial determination engine 310 may ensure there are m1 spaces for compact vehicles before setting aside available spaces for larger size vehicles. As still another example, parking spatial determination engine 310 may alter or adjust these parking space determination based on other factors such as whether a particular day is a work day or weekend/holiday, whether there is an event nearby, and so forth.

In embodiments, parking spatial determination engine 310 may also receive from other sensors 314 (such as sensors embedded at various locations within the expanse of space being managed), sensor data 348 on presence or absent of objects within sensing spans of the sensors. For these embodiments, parking spatial determination engine 310 may determine the map of parking spaces 344 (including their availability) further based on sensor data 348.

In embodiments, parking space allocation engine 310 may be configured to receive parking space requests from vehicles, e.g., from a mobile communication device associated with a driver/vehicle, or the ADAS of a vehicle. The requests may include information about the vehicles, their needs (e.g., the duration of time the vehicles will need the parking spaces), and their preferences. In embodiments, smart parking management system 300 (or a supporting cloud server) may include a database of vehicle information, from past usage or pre-registration. For these embodiments, the requests may include identification of the requesting vehicles. From the identification information, parking space allocation engine 310 may retrieve information about the vehicles, their preferences, and so forth. On receipt of the request (and associated information), parking space allocation engine 310 may match the request to available parking spaces. If a match is found, the matching parking space may be assigned and allocated to the requesting vehicle. If a match is not found, the requesting vehicle may be notified of unavailability of space. In embodiments, parking space allocation engine 310, e.g., either via direct communication with neighboring parking space allocation engines 310 or with a supporting cloud server, may further provide guidance to a requesting vehicle regarding potential availability of parking spaces in another expanse of space.

In embodiments, each of pre-processor 304, detection/identification engine 306, scene segmentation engine 308, parking spatial determination engine 310, and parking space allocation engine 310 may be implemented in hardware, such as ASIC, hardware accelerators like FPGA, or in software/firmware executed by a computer processor (shared, dedicated, or group) and/or memory (shared, dedicated, or group), or a combination thereof.

In embodiments, pre-processor 304, detection/identification engine 306, scene segmentation engine 308, parking spatial determination engine 310, and parking space allocation engine 310 may all be components of a smart parking management unit/gateway, such smart parking management unit/gateway 104 of FIG. 1. In other embodiments, selected ones of pre-processor 304, detection/identification engine 306, scene segmentation engine 308, and/or parking spatial determination engine 310 may be implemented in one or more cloud severs, such as cloud servers 106 of FIG. 1. For these embodiments, the captured images 322, the background/noise removed images/videos 324/326, objects, pedestrian, vehicle information/data 328-338 may be transmitted between the local smart parking management unit/gateways and the cloud servers.

Figure 4:
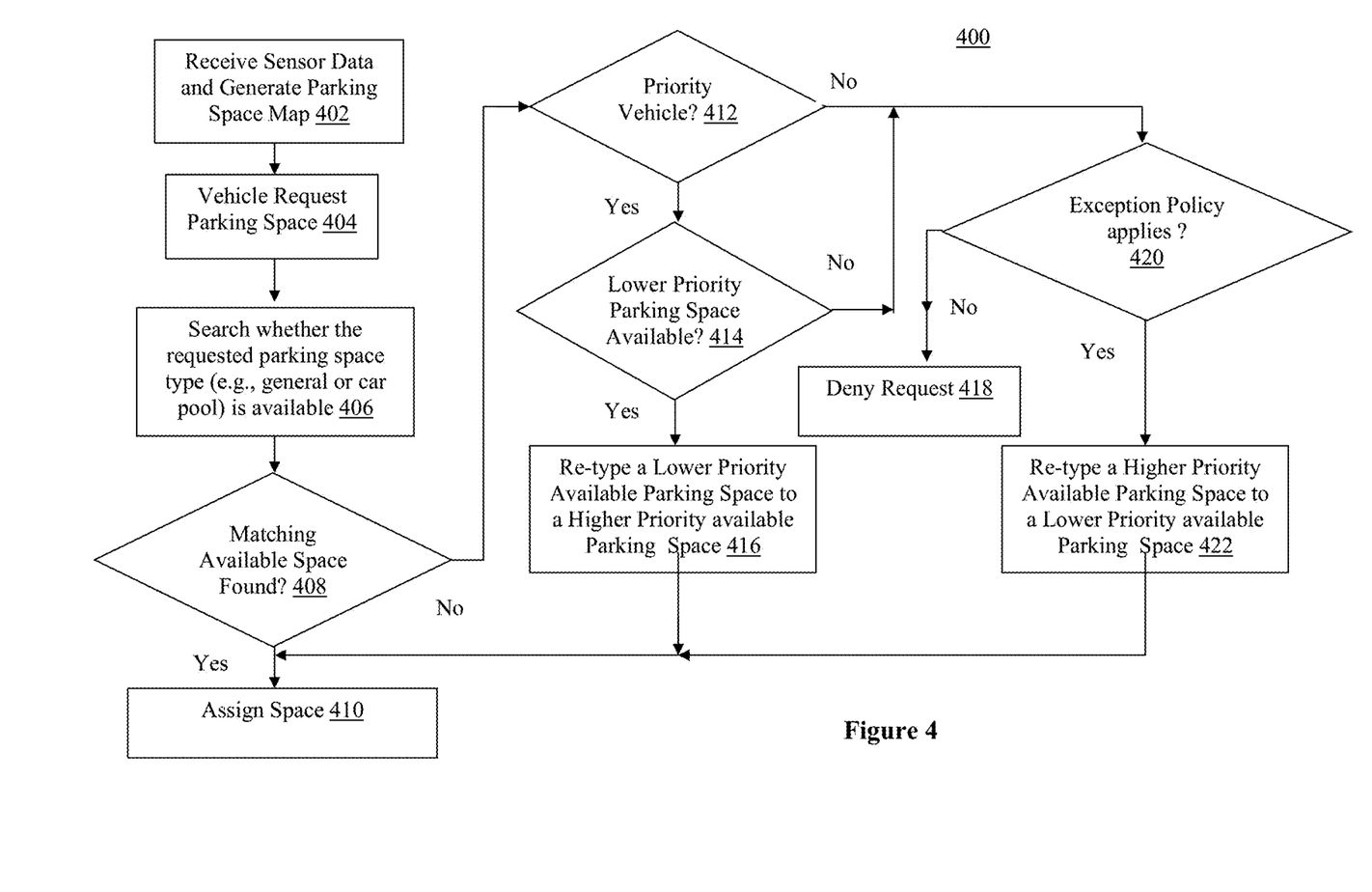
FIG. 4 is a flow diagram of some operational aspects of a smart parking management system, in accordance with various embodiments.

Referring now to FIG. 4, wherein a flow diagram of some operational aspects of a smart parking management system, in accordance with various embodiments, is shown. As illustrated, in embodiments, a process 400 for managing parking in an expanse of space may comprise operations performed at blocks 402-422. The operations performed at blocks 402-422 may be performed by e.g., pre-processor 304, detection/identification engine 306, scene segmentation engine 308, parking spatial determination engine 310, and/or parking space allocation engine 310 of smart parking system 300 of FIG. 3.

Process 400 may start at block 402. At block 402, sensor data for an expanse of space being managed may be received, and a parking space map for the expanse of space being managed may be generated. As described earlier, the parking space map may include parking spaces of fixed or variable sizes for various usage and/or vehicle types, and their statuses, occupied or available.

Next, at block 404, a request for a parking space may be received from a vehicle or its driver. As described earlier, the request may include the persona of the driver and/or the vehicle. In embodiments where vehicles may be registered and/or prior parking history is maintained, the request may include an identifier of the driver and/or the vehicle to allow their personas to be retrieved.

At block 406, a search may be performed to locate available parking spaces that match the requirements in terms of size, usage type, duration of availability, and so forth. At block 408, a determination may be made on whether at least one matching available space is found. If at least one matching available space is found, process 400 may proceed to block 410, where one of the at least one matching available parking space is assigned/allocated to the requesting vehicle. And the driver or ADAS of the vehicle may be informed accordingly. On assignment/allocation, the available parking space map may be updated.

On the other hand, if the determination at block 408 results in no matching available space is found, process 400 may proceed to block 412. At block 412, a further determination may be made on whether the driver/vehicle persona is of a priority type entitled to have parking spaces of other non-matching types to be re-typed as a matching type. For example, the determination may be made on whether the vehicle is a car pool vehicle, and thus is entitled to have general use available parking spaces re-typed to be car pool available parking spaces.

If a result of the determination indicates the driver/vehicle persona is of a priority entitled to have parking spaces of other non-matching types to be re-typed as a matching type, a further determination may be made at block 414 on whether there are any lower priority available parking spaces. For the above car pool example, a determination may be made on whether there are general use parking spaces available to be re-typed.

If a result of the determination at block 414 indicates there are lower priority available parking spaces, process 400 may proceed to block 416. At block 416, one or more of the lower priority available parking spaces may be re-typed to the matching priority type of the vehicle in need of a parking space.

Back at blocks 412 and 414, if a result of the determination at block 412 indicates that the requesting vehicle does not in general entitles to have a lower priority available parking space to re-typed to match its need (e.g., a vehicle in need of a general parking space is in general not entitled to have a car pool parking space re-typed to meet its need), or if a result of the determination at block 414 indicates that there are no lower priority available parking spaces to be re-typed to meet the need of the requesting vehicle, a determination may be made at block 420 on whether one or more exception policies apply allowing a higher priority available parking space to be re-typed to a lower priority to meet the need of the request vehicle. For example, a determination may be made on whether it is a weekend, thus it is permitted to re-type a car pool parking space to a general use parking space.

If a result of the determination at block 420 indicates no exception policy applies to re-type a higher priority available parking space to a lower priority available parking space to match the need of the requesting vehicle, at block 418, the request may be denied/declined.

On the other hand, if a result of the determination at block 420 indicates at least one exception policy applies to re-type a higher priority available parking space to a lower priority available parking space to match the need of the requesting vehicle, at block 422, a higher priority available parking space may be re-typed o a lower priority available parking space (e.g., from a car pool parking space to a general use parking space) to match the need of the requesting vehicle.

Form blocks 416 and 418, process 400 may proceed to block 410, and proceed as earlier described to assign/allocate the matching available parking space to the requesting vehicle. On assignment, the map of available parking spaces may be updated.

In embodiments, updating of the map of available parking spaces may include more than just updating the status of the assigned/allocated parking space as available. Updating of the map of available parking spaces, on assignment/allocation of an available space, may include pro-actively re-typing available parking spaces, and/or re-partition the remaining unoccupied portions of the expanse of the space being managed. For example, if on assignment, the usage pattern significantly deviates from an expected usage pattern for the day or for the hour, the unoccupied portions of the expanse of space being managed may be re-partitioned and/or re-typed to more suitable for the actual observed usage pattern for the day or for the hour. As a further example, if the available parking spaces are fragmented in the expanse of space being managed, vehicles with ADAS may be moved/re-parked to de-frag and re-partition the unoccupied space into a more efficient configuration. These are non-limiting examples. Many other triggers and many other re-generation of the map of available parking spaces are possible.

Figure 5:
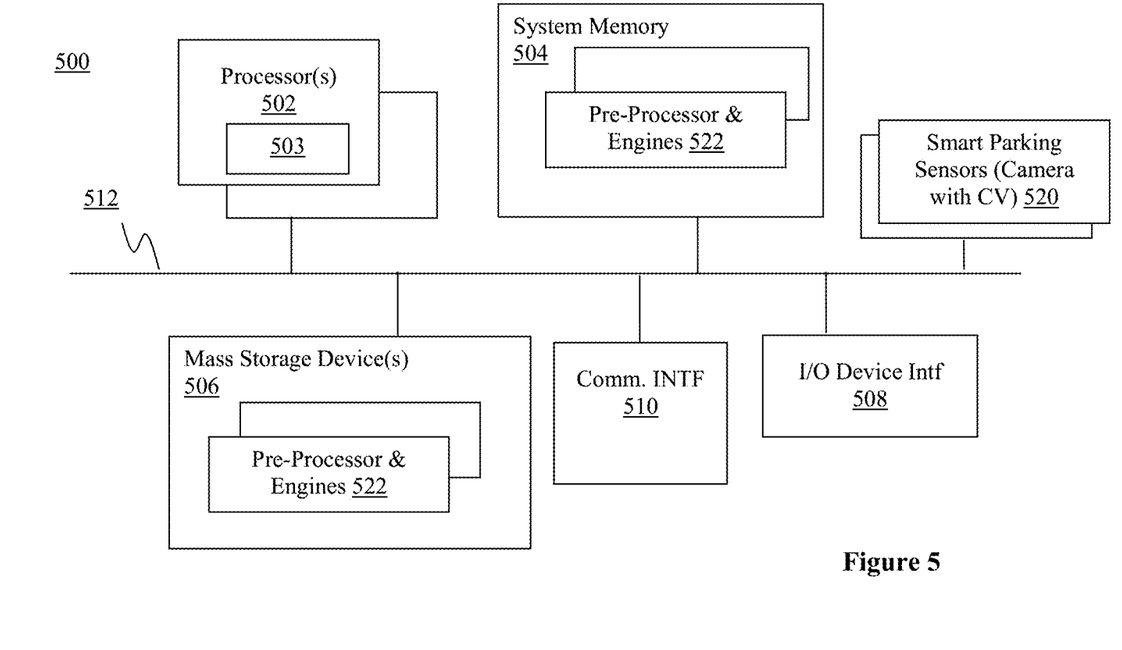
FIG. 5 illustrates an example computer system suitable for practicing aspects of the present disclosure, in accordance with various embodiments.

Referring now to FIG. 5, wherein a block diagram of a computer device suitable for practice aspects of the present disclosure, in accordance with various embodiments, is illustrated. Depending on the elements included, and the capacity of the elements included, computer device 500 may be suitable for use as a smart parking management unit/gateway 104 of FIG. 1, 204a/204b of FIG. 2A/2B, or 300 of FIG. 3, cloud server 106 of FIG. 1, or an ADAS system of vehicles 116 of FIG. 1.

As shown, in embodiments, computer device 500 may include one or more processors 502 and system memory 504. Each processor 502 may include one or more processor cores. In embodiments, one or more processors 502 may include one or more hardware accelerators (such as, FPGA). System memory 504 may include any known volatile or non-volatile memory. Additionally, computer device 500 may include mass storage device(s) 506 (such as solid state drives), input/output device interface 508 (to interface with users) and communication interfaces 510 (such as network interface cards, modems and so forth). In embodiments, communication interfaces 510 may support wired or wireless communication, including near field communication. In embodiments, computer system 500 may further include smart parking sensors 520 to provide computer visions for computer device 500, such as smart parking sensors 102 of FIG. 1. The elements may be coupled to each other via system bus 512, which may represent one or more buses. In the case of multiple buses, they may be bridged by one or more bus bridges (not shown).

Each of these elements may perform its conventional functions known in the art. In particular, system memory 504 and mass storage device(s) 506 may be employed to store a working copy and a permanent copy of the executable code of the programming instructions implementing the operations described earlier, e.g., but are not limited to, operations associated with pre-processor 304, detection/identification engine 306, scene segmentation engine 308, parking spatial determination engine 310, parking space allocation engine 310 of FIG. 3, or ADAS of vehicles 116 of FIG. 1, collectively referred pre-processor and/or engines 522. The programming instructions may comprise assembler instructions supported by processor(s) 502 or high-level languages, such as, for example, C, that can be compiled into such instructions. In embodiments, system memory 504 and mass storage device(s) 506 may also be employed to store a working copy and a permanent copy of various working or reference data 524. In embodiments, some of the functions performed by pre-processor 304, detection/identification engine 306, scene segmentation engine 308, parking spatial determination engine 310, parking space allocation engine 310 of FIG. 3, or ADAS of vehicles 116 of FIG. 1, may be implemented with hardware processor 503 instead.

The permanent copy of the executable code of the programming instructions and/or the bit streams to configure hardware accelerator 503 may be placed into permanent mass storage device(s) 506 or hardware accelerator 503 in the factory, or in the field, through, for example, a distribution medium (not shown), such as a compact disc (CD), or through communication interface 510 (from a distribution server (not shown)).

Except for the use of computer system 500 as smart parking management unit/gateway 104 of FIG. 1, 204a/204b of FIG. 2A/2B, or 300 of FIG. 3, cloud server 106 of FIG.

1, or an ADAS system of vehicles 116 of FIG. 1, constitutions of the elements 510-512 are otherwise known, and accordingly will not be further described.

Figure 6:
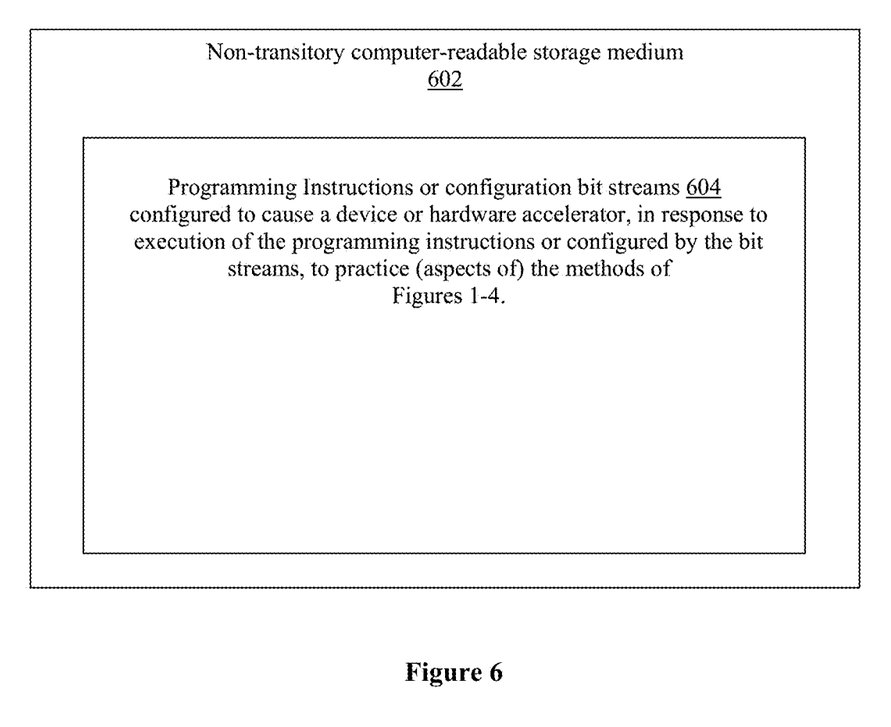
FIG. 6 illustrates an example storage medium with instructions configured to enable a computer system to practice the present disclosure, in accordance with various embodiments.

FIG. 6 illustrates an example non-transitory computer-readable storage medium having instructions configured to practice all or selected ones of the operations associated with the spectral signature assisted finger associated user application, earlier described, in accordance with various embodiments. As illustrated, non-transitory computer-readable storage medium 602 may include the executable code of a number of programming instructions or configuration bit streams 604). Executable code of programming instructions/bit streams 604 may be configured to enable a device, e.g., computer device 500, or a hardware processor 503 disposed therein, in response to execution of the executable code/programming instructions or being configured by the bit streams, to perform, e.g., various operations associated with pre-processor 304, detection/identification engine 306, scene segmentation engine 308, parking spatial determination engine 310, parking space allocation engine 310 of FIG. 3, or ADAS of vehicles 116 of FIG. 1, described with references to FIGS. 1-4. In alternate embodiments, executable code/programming instructions/bit streams 604 may be disposed on multiple non-transitory computer-readable storage media 602 instead. In still other embodiments, executable code/programming instructions/bit streams 604 may be encoded in transitory computer readable medium, such as signals.

Referring back to FIG. 5, for one embodiment, at least one of processors 502 may be packaged together with a computer-readable storage medium having some or all of pre-processor/engines 522, configured to practice all or selected ones of the operations earlier described with references to FIG. 1-4. For one embodiment, at least one of processors 502 may be packaged together with a computer-readable storage medium having some or all of pre-processor/engines 522 to form a System in Package (SiP). For one embodiment, at least one of processors 502 may be integrated on the same die with a computer-readable storage medium having some or all of pre-processor/engines 522. For one embodiment, at least one of processors 502 may be packaged together with a computer-readable storage medium having some or all of pre-processor/engines 522 to form a System on Chip (SoC). For at least one embodiment, the SoC may be utilized in, e.g., but not limited to, a hybrid computing tablet/laptop.

Thus an improved apparatus, method and storage medium associated with smart parking management has been described.

Example 1 may be a system for managing parking of vehicles, comprising: a plurality of sensors disposed around an expanse of space to collect occupancy data of the expanse of space; and a parking management unit disposed at or adjoining the expanse of space, and communicatively coupled with the plurality of sensors, to manage parking of vehicles in the expanse of space, based at least in part on the occupancy data collected by the plurality of sensors.

Example 2 may be example 1, wherein the expanse of space may be a linear expanse of roadway space adjacent to a sidewalk, or an aerial expanse of surface space of a parking lot or a floor of a parking structure; and wherein the parking management unit may be dedicated to manage parking of vehicles within the linear expanse of roadway space adjacent to the sidewalk, or the aerial expanse of surface space of a parking lot or a floor of a parking structure.

Example 3 may be example 1, wherein the plurality of sensors may comprise a plurality of cameras disposed around the expanse of space to capture images of the expanse of space; wherein the parking management unit may determine availability of parking spaces within the expanse of space, based at least in part on the images captured.

Example 4 may be example 3, wherein to determine availability of parking spaces, the parking management unit may determine an unoccupied segment or area of the expanse of space, and partition the unoccupied segment or area of the expanse of space into parking spaces for assignment to vehicles in need of parking spaces.

Example 5 may be example 4, wherein partition of the unoccupied segment or area of the expanse of space into parking spaces may be further based in part on space needs of the vehicles.

Example 6 may be example 1, wherein the vehicles may comprise vehicles of a plurality of sizes or vehicles of a plurality of types including at least two of a manual park type, an assisted park type, an automated drive and park type, or a fully automated navigate and park type.

Example 7 may be example 1, wherein parking spaces within the expanse of space may be typed, including at least an unreserved type or one or more reserved types.

Example 8 may be example 7, wherein to determine availability of parking spaces, the parking management unit may dynamically type and re-type parking spaces.

Example 9 may be example 1, wherein the plurality of sensors may be first plurality of sensors, and the system may further comprise a second plurality of sensors respectively embedded in a plurality of portions of the expanse of space to collect sensor data on presence or absence of objects within the respective portions of the expanse of space; wherein the parking management unit may manage parking of vehicles in the expanse of space, further based at least on the sensor data collected by the second plurality of sensors.

Example 10 may be any one of examples 1-8, wherein the expanse of space may be a first expanse of space, and the plurality of sensors may be first plurality of sensors; wherein the system may further comprise a second plurality of sensors disposed around a second expanse of space to collect occupancy data of the second expanse of space; wherein the parking management unit may be located in or adjoining the second expanse of space; wherein the parking management unit may be also communicatively coupled with the second plurality of sensors, to manage parking of vehicles in the second expanse of space, based at least in part on the occupancy data collected by the second plurality of sensors.

Example 10 may be any one of examples 1-8, wherein the expanse of space may be a first expanse of space, the plurality of sensors may be first plurality of sensors, and the parking management unit may be a first parking management unit; wherein the system may further comprise: a second plurality of sensors disposed around a second expanse of space to collect occupancy data of the second expanse of space; a second parking management unit disposed in or adjourning the second expanse of space, and communicatively coupled with the second plurality of sensors, to manage parking of vehicles in the second expanse of space, based at least in part on the occupancy data collected by the second plurality of sensors; and one or more cloud servers communicatively coupled with the first and second parking management units to assist the first and second parking management units in managing parking of vehicles in the first and second expanses of spaces.

Example 12 may be an apparatus for managing parking of vehicles, comprising: a parking spatial determination engine to process one or more captured images of an expanse of space, or one or more pre-processed versions of the captured images of the expanse of space to identify an unoccupied portion of the expanse of space, and determine one or more available parking spaces within the identified unoccupied portion of the expanse of space; wherein the one or more captured images may be captured by one or more cameras disposed around the expanse of space, and the one or more pre-processed versions of the captured images may be the captured images pre-processed to at least removed background or noise; and wherein the determined one or more available parking spaces may be allocated to vehicles in need of parking spaces.

Example 13 may be example 12, wherein to determine one or more available parking spaces, the parking spatial determination engine may determine one or more dimensions of the unoccupied portion of the expanse of space identified, and determine the one or more available parking spaces within the identified unoccupied portion of the expanse of space based at least in part on the determined one or more dimensions of the identified unoccupied portion of the expanse of space; wherein the one or more dimensions may include a depth or a length.

Example 14 may be example 12, wherein to determine one or more available parking spaces may include to partition the identified unoccupied portion of the expanse of space into a plurality of available parking spaces of fixed or variable sizes, when dimensions of the identified unoccupied portion of the expanse of space may be sufficient to support more than one vehicle of a particular size.

Example 15 may be example 12, further comprising a pre-processor to pre-process the initially captured images of the expanse of space to remove background or noise from the initially captured images, and to output the background or noise removed images of the expanse of space directly to the parking spatial determination engine, or indirectly to the parking spatial determination engine after additional processing of the background or noise removed images of the expanse of space.

Example 16 may be example 12, further comprising a detection or identification engine to process the at least background or noise removed images of the expanse of space to detect or identify objects within the at least background or noise removed images the expanse of space; and output object detection or identification information directly to the parking spatial determination engine, or indirectly to the parking spatial determination engine, after additional processing of the object detected or identified images of the expanse of space.

Example 17 may be example 12, further comprising a scene segmentation engine to process the at least background or noise removed images of the expanse of space to recognize pedestrian traffic, moving vehicles, parked vehicles, license plates of vehicles, or identities of drivers or passengers of vehicles within the expanse of space, and output the recognized pedestrian traffic, moving vehicles, parked vehicles, license plates of vehicles, or identities of drivers or passengers of vehicles to the parking spatial determination engine.

Example 18 may be any one of examples 12-16 further comprising a parking space allocation engine to allocate an available parking space that can accommodate a vehicle in need of a parking space, to the vehicle in need of a parking space.

Example 19 may be example 18, further comprising a hardware accelerator programmed with logic to implement one of the engines.

Example 20 may be example 18, further comprising a computer processor to operate one or more of the engines.

Example 21 may be example 18, wherein the apparatus may be a parking management unit disposed in or adjourning the expanse of space.

Example 22 may be example 18, wherein the apparatus may be a cloud server to support a plurality of parking management units respectively disposed at a plurality of expanses of spaces.

Example 23 may be a method for managing parking, comprising: collecting with a plurality of sensors disposed around an expanse of space, occupancy data of the expanse of space; and managing with a parking management unit disposed in or adjourning the expanse of space, parking of vehicles in the expanse of space, based at least in part on the occupancy data collected by the plurality of sensors.

Example 24 may be example 23, wherein the expanse of space may be a linear expanse of roadway space adjacent to a sidewalk, or an aerial expanse of surface space of a parking lot or a floor of a parking structure; and wherein the parking management unit may be dedicated to manage parking of vehicles within the linear expanse of roadway space adjacent to the sidewalk, or the aerial expanse of surface space of a parking lot or a floor of a parking structure.

Example 25 may be example 23, wherein the plurality of sensors may comprise a plurality of cameras disposed around the expanse of space to capture images of the expanse of space; wherein managing may comprise determining availability of parking spaces within the expanse of space, based at least in part on the images captured.

Example 26 may be example 25, wherein determining availability of parking spaces may comprise determining an unoccupied segment or area of the expanse of space, and partitioning the unoccupied segment or area of the expanse of space into parking spaces for assignment to vehicles in need of parking spaces.

Example 27 may be example 26, wherein partitioning of the unoccupied segment or area of the expanse of space into parking spaces may be further based in part on space needs of the vehicles.

Example 28 may be example 23, wherein parking spaces within the expanse of space may be typed, including at least an unreserved type or one or more reserved types; and wherein determining availability of parking spaces may comprise dynamically typing and re-typing parking spaces.

Example 29 may be example 23, wherein the plurality of sensors may be first plurality of sensors, and the method may further comprise collecting from a second plurality of sensors respectively embedded in a plurality of portions of the expanse of space sensor data on presence or absence of objects within the respective portions of the expanse of space; wherein managing parking of vehicles in the expanse of space may be further based at least on the sensor data collected by the second plurality of sensors.

Example 30 may be any one of examples 23-28, wherein the expanse of space may be a first expanse of space, and the plurality of sensors may be first plurality of sensors; wherein the method may further comprise collecting from a second plurality of sensors disposed around a second expanse of space to collect occupancy data of the second expanse of space; wherein the parking management unit may be located in or adjoining the second expanse of space and communicatively coupled with the second plurality of sensors; and wherein managing parking of vehicles may further comprise managing parking of vehicles in the second expanse of space, based at least in part on the occupancy data collected by the second plurality of sensors.

Example 31 may be any one of examples 23-28, wherein the expanse of space may be a first expanse of space, the plurality of sensors may be first plurality of sensors, and the parking management unit may be a first parking management unit; wherein the method may further comprise: collecting from a second plurality of sensors disposed around a second expanse of space to collect occupancy data of the second expanse of space; managing, with a second parking management unit disposed in or adjourning the second expanse of space, and communicatively coupled with the second plurality of sensors, parking of vehicles in the second expanse of space, based at least in part on the occupancy data collected by the second plurality of sensors; and assisting, with one or more cloud servers, the first and second parking management units in managing parking of vehicles in the first and second expanses of spaces.

Example 32 may be at least one computer readable media (CRM) comprising a plurality of instructions configured to cause a computer device, in response to execution of the instructions, to process one or more captured images of an expanse of space, or one or more pre-processed versions of the captured images of the expanse of space to identify an unoccupied portion of the expanse of space, and determine one or more available parking spaces within the identified unoccupied portion of the expanse of space; wherein the one or more captured images may be captured by one or more cameras disposed around the expanse of space, and the one or more pre-processed versions of the captured images may be the captured images pre-processed to at least removed background or noise; and wherein the determined one or more available parking spaces may be allocated to vehicles in need of parking spaces.

Example 33 may be example 32, wherein to determine one or more available parking spaces, the computing device may determine one or more dimensions of the unoccupied portion of the expanse of space identified, and determine the one or more available parking spaces within the identified unoccupied portion of the expanse of space based at least in part on the determined one or more dimensions of the identified unoccupied portion of the expanse of space; wherein the one or more dimensions may include a depth or a length.

Example 34 may be example 32, wherein to determine one or more available parking spaces may include to partition the identified unoccupied portion of the expanse of space into a plurality of available parking spaces of fixed or variable sizes, when dimensions of the identified unoccupied portion of the expanse of space may be sufficient to support more than one vehicle of a particular size.

Example 35 may be example 32, wherein the computing device may be further caused to pre-process the initially captured images of the expanse of space to remove background or noise from the initially captured images, and to output the background or noise removed images of the expanse of space directly to the parking spatial determination engine, or indirectly to the parking spatial determination engine after additional processing of the background or noise removed images of the expanse of space.

Example 36 may be example 32, wherein the computing device may be further caused to process the at least background or noise removed images of the expanse of space to detect or identify objects within the at least background or noise removed images the expanse of space; and output object detection or identification information directly to the parking spatial determination engine, or indirectly to the parking spatial determination engine, after additional processing of the object detected or identified images of the expanse of space.

Example 37 may be example 32, wherein the computing device may be further caused to process the at least background or noise removed images of the expanse of space to recognize pedestrian traffic, moving vehicles, parked vehicles, license plates of vehicles, or identities of drivers or passengers of vehicles within the expanse of space, and output the recognized pedestrian traffic, moving vehicles, parked vehicles, license plates of vehicles, or identities of drivers or passengers of vehicles to the parking spatial determination engine.

Example 38 may be any one of examples 32-36 wherein the computing device may be further caused to allocate an available parking space that can accommodate a vehicle in need of a parking space, to the vehicle in need of a parking space.

Example 39 may be example 38, wherein the computing device may be a parking management unit disposed in or adjourning the expanse of space.

Example 40 may be example 38, wherein the computing device may be a cloud server to support a plurality of parking management units respectively disposed at a plurality of expanses of spaces.

Example 41 may be an apparatus for managing parking, comprising: means to be disposed around an expanse of space, for collecting occupancy data of the expanse of space; and means to be disposed in or adjourning the expanse of space, for managing parking of vehicles in the expanse of space, based at least in part on the occupancy data collected by the plurality of sensors.

Example 42 may be example 41, wherein the expanse of space may be a first expanse of space, and the plurality of sensors may be first plurality of sensors; wherein the apparatus may further comprise means for collecting from a second plurality of sensors disposed around a second expanse of space to collect occupancy data of the second expanse of space; means located in or adjoining the second expanse of space for managing parking of vehicles in the second expanse of space, based at least in part on the occupancy data collected by the second plurality of sensors.

Example 43 may be example 41, wherein the expanse of space may be a first expanse of space, the plurality of sensors may be first plurality of sensors, and the means for managing may be a first means for managing; wherein the apparatus may further comprise: means for collecting from a second plurality of sensors disposed around a second expanse of space to collect occupancy data of the second expanse of space; second means for managing parking of vehicles in the second expanse of space, based at least in part on the occupancy data collected by the second plurality of sensors; and means for remotely assisting the first and second parking management units, via one or more networks, in managing parking of vehicles in the first and second expanses of spaces.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A system for managing parking of vehicles, comprising:
   a plurality of sensors disposed around an expanse of space to collect occupancy data of the expanse of space; and
   a parking management unit disposed at or adjoining the expanse of space, and communicatively coupled with the plurality of sensors, to manage parking of vehicles in the expanse of space, based at least in part on the occupancy data collected by the plurality of sensors;
   wherein the plurality of sensors comprise a plurality of cameras disposed around the expanse of space to capture images of the expanse of space; wherein the parking management unit is to determine availability of parking spaces within the expanse of space, based at least in part on the images captured; and
   wherein to determine availability of parking spaces, the parking management unit is to determine an unoccupied segment or area of the expanse of space, and partition the unoccupied segment or area of the expanse of space into parking spaces for assignment to vehicles in need of parking spaces.

2. The system of claim 1, wherein the expanse of space is a linear expanse of roadway space adjacent to a sidewalk, or an aerial expanse of surface space of a parking lot or a floor of a parking structure; and wherein the parking management unit is dedicated to manage parking of vehicles within the linear expanse of roadway space adjacent to the sidewalk, or the aerial expanse of surface space of a parking lot or a floor of a parking structure.

3. The system of claim 1, wherein partition of the unoccupied segment or area of the expanse of space into parking spaces is further based in part on space needs of the vehicles.

4. The system of claim 1, wherein the vehicles comprise vehicles of a plurality of sizes or vehicles of a plurality of types including at least two of a manual park type, an assisted park type, an automated drive and park type, or a fully automated navigate and park type.

5. The system of claim 1, wherein parking spaces within the expanse of space are typed, including at least an unreserved type or one or more reserved types.

6. The system of claim 5, wherein to determine availability of parking spaces, the parking management unit is to dynamically type and re-type parking spaces.

7. The system of claim 1, wherein the plurality of sensors are first plurality of sensors, and the system further comprises a second plurality of sensors respectively embedded in a plurality of portions of the expanse of space to collect sensor data on presence or absence of objects within the respective portions of the expanse of space; wherein the parking management unit is to manage parking of vehicles in the expanse of space, further based at least on the sensor data collected by the second plurality of sensors.

8. The system of claim 1, wherein the expanse of space is a first expanse of space, and the plurality of sensors are first plurality of sensors; wherein the system further comprises a second plurality of sensors disposed around a second expanse of space to collect occupancy data of the second expanse of space; wherein the parking management unit is located in or adjoining the second expanse of space; wherein the parking management unit is also communicatively coupled with the second plurality of sensors, to manage parking of vehicles in the second expanse of space, based at least in part on the occupancy data collected by the second plurality of sensors.

9. The system of claim 1, wherein the expanse of space is a first expanse of space, the plurality of sensors are first plurality of sensors, and the parking management unit is a first parking management unit;
   wherein the system further comprises:
   a second plurality of sensors disposed around a second expanse of space to collect occupancy data of the second expanse of space;
   a second parking management unit disposed in or adjoining the second expanse of space, and communicatively coupled with the second plurality of sensors, to manage parking of vehicles in the second expanse of space, based at least in part on the occupancy data collected by the second plurality of sensors; and
   one or more cloud servers communicatively coupled with the first and second parking management units to assist the first and second parking management units in managing parking of vehicles in the first and second expanses of spaces.

10. An apparatus for managing parking of vehicles, comprising:
    a parking spatial determination engine to process one or more captured images of an expanse of space, or one or more pre-processed versions of the captured images of the expanse of space to identify an unoccupied portion of the expanse of space, and define one or more available parking spaces within the identified unoccupied portion of the expanse of space;
    wherein to define one or more available parking spaces includes to partition the identified unoccupied portion of the expanse of space into a plurality of available parking spaces of fixed or variable sizes, when dimensions of the identified unoccupied portion of the expanse of space are sufficient to support more than one vehicle of a particular size;
    wherein the one or more available parking spaces defined within the identified unoccupied portion of the expanse of space are allocated to vehicles in need of parking spaces.

11. The apparatus of claim 10, wherein to define one or more available parking spaces, the parking spatial determination engine is to determine one or more dimensions of the unoccupied portion of the expanse of space identified, and define the one or more available parking spaces within the identified unoccupied portion of the expanse of space based at least in part on the determined one or more dimensions of the identified unoccupied portion of the expanse of space; wherein the one or more dimensions include a depth or a length.

12. The apparatus of claim 10, wherein the one or more captured images are captured by one or more cameras disposed around the expanse of space, and the one or more pre-processed versions of the captured images are the captured images pre-processed to at least remove background or noise.

13. The apparatus of claim 10, further comprising a pre-processor to pre-process the initially captured images of the expanse of space to remove background or noise from the initially captured images, and to output the background or noise removed images of the expanse of space directly to the parking spatial determination engine, or indirectly to the parking spatial determination engine after additional processing of the background or noise removed images of the expanse of space.

14. The apparatus of claim 10, further comprising a detection or identification engine to process the at least background or noise removed images of the expanse of space to detect or identify objects within the at least background or noise removed images of the expanse of space; and output object detection or identification information directly to the parking spatial determination engine, or indirectly to the parking spatial determination engine, after additional processing of the object detected or identified images of the expanse of space.

15. The apparatus of claim 10, further comprising a scene segmentation engine to process the at least background or noise removed images of the expanse of space to recognize pedestrian traffic, moving vehicles, parked vehicles, license plates of vehicles, or identities of drivers or passengers of vehicles within the expanse of space, and output the recognized pedestrian traffic, moving vehicles, parked vehicles, license plates of vehicles, or identities of drivers or passengers of vehicles to the parking spatial determination engine.

16. The apparatus of claim 10, further comprising a parking space allocation engine to allocate an available parking space that can accommodate a vehicle in need of a parking space, to the vehicle in need of a parking space.

17. The apparatus of claim 10, further comprising a hardware accelerator programmed with logic to implement one of the engines.

18. The apparatus of claim 10, wherein the apparatus is a parking management unit disposed in or adjoining the expanse of space, or a cloud server to support a plurality of parking management units respectively disposed at a plurality of expanses of spaces.

19. A method for managing parking, comprising:
collecting with a plurality of sensors disposed around an expanse of space, occupancy data of the expanse of space; and
managing with a parking management unit disposed in or adjoining the expanse of space, parking of vehicles in the expanse of space, based at least in part on the occupancy data collected by the plurality of sensors;
wherein the plurality of sensors comprise a plurality of cameras disposed around the expanse of space to capture images of the expanse of space, and managing comprises determining availability of parking spaces within the expanse of space, based at least in part on the images captured;
wherein determining availability of parking spaces includes determining an unoccupied segment or area of the expanse of space, and partition the unoccupied segment or area of the expanse of space into parking spaces for assignment to vehicles in need of parking spaces.

20. The method of claim 19, wherein the expanse of space is a first expanse of space, and the plurality of sensors are first plurality of sensors; wherein the method further comprises collecting from a second plurality of sensors disposed around a second expanse of space to collect occupancy data of the second expanse of space; wherein the parking management unit is located in or adjoining the second expanse of space and communicatively coupled with the second plurality of sensors; and wherein managing parking of vehicles further comprises managing parking of vehicles in the second expanse of space, based at least in part on the occupancy data collected by the second plurality of sensors.

21. The method of claim 19, wherein the expanse of space is a first expanse of space, the plurality of sensors are first plurality of sensors, and the parking management unit is a first parking management unit;
wherein the method further comprises:
collecting from a second plurality of sensors disposed around a second expanse of space to collect occupancy data of the second expanse of space;
managing, with a second parking management unit disposed in or adjoining the second expanse of space, and communicatively coupled with the second plurality of sensors, parking of vehicles in the second expanse of space, based at least in part on the occupancy data collected by the second plurality of sensors; and
assisting, with one or more cloud servers, the first and second parking management units in managing parking of vehicles in the first and second expanses of spaces.

22. At least one non-transitory computer readable media (CRM) comprising a plurality of instructions configured to cause a computer device, in response to execution of the instructions, to process one or more captured images of an expanse of space, or one or more pre-processed versions of the captured images of the expanse of space to identify an unoccupied portion of the expanse of space, and define one or more available parking spaces within the identified unoccupied portion of the expanse of space;
wherein the one or more captured images are captured by one or more cameras disposed around the expanse of space, and the one or more pre-processed versions of the captured images are the captured images pre-processed to at least remove background or noise;
wherein to define one or more available parking spaces includes to partition the identified unoccupied portion of the expanse of space into a plurality of available parking spaces of fixed or variable sizes, when dimensions of the identified unoccupied portion of the expanse of space are sufficient to support more than one vehicle of a particular size; and
wherein the one or more available parking spaces defined within the identified unoccupied portion of the expanse of space are allocated to vehicles in need of parking spaces.

23. The non-transitory CRM of claim 22, wherein the computing device is further caused to:
pre-process the initially captured images of the expanse of space to remove background or noise from the initially captured images, and to output the background or noise removed images of the expanse of space directly to a parking spatial determination engine, or indirectly to the parking spatial determination engine after additional processing of the background or noise removed images of the expanse of space;
process the at least background or noise removed images of the expanse of space to detect or identify objects within the at least background or noise removed images of the expanse of space; and output object detection or identification information directly to the parking spatial determination engine, or indirectly to the parking spatial determination engine, after additional processing of the object detected or identified images of the expanse of space;
process the at least background or noise removed images of the expanse of space to recognize pedestrian traffic, moving vehicles, parked vehicles, license plates of vehicles, or identities of drivers or passengers of vehicles within the expanse of space, and output the recognized pedestrian traffic, moving vehicles, parked vehicles, license plates of vehicles, or identities of drivers or passengers of vehicles to the parking spatial determination engine; or allocate an available parking space that can accommodate a vehicle in need of a parking space, to the vehicle in need of a parking space.

\* \* \* \* \*